(12) United States Patent
Brown (10) Patent No.: US 9,101,884 B2
(45) Date of Patent: Aug. 11, 2015

(54) ENHANCED SPIRAL-WOUND MEMBRANE FILTRATION

(75) Inventor: Neal A. Brown, San Diego, CA (US)

(73) Assignee: NAB & Associates, Inc., San Diego, CA (US)

( * ) Notice: Subject to any disclaimer, the term of this patent is extended or adjusted under 35 U.S.C. 154(b) by 0 days.

(21) Appl. No.: 13/579,662

(22) PCT Filed: Feb. 18, 2011

(86) PCT No.: PCT/US2011/025521
§ 371 (c)(1),
(2), (4) Date: Aug. 17, 2012

(87) PCT Pub. No.: WO2011/103496
PCT Pub. Date: Aug. 25, 2011

(65) Prior Publication Data
US 2012/0318724 A1    Dec. 20, 2012

Related U.S. Application Data

(60) Provisional application No. 61/305,648, filed on Feb. 18, 2010.

(51) Int. Cl.
| | | |
|---|---|---|
| *B01D 21/30* | (2006.01) |
| *B01D 63/00* | (2006.01) |
| *B01D 24/30* | (2006.01) |
| *B01D 63/10* | (2006.01) |
| *B01D 63/16* | (2006.01) |

(52) U.S. Cl.
CPC .............. *B01D 63/10* (2013.01); *B01D 63/106* (2013.01); *B01D 63/16* (2013.01); *B01D 2313/20* (2013.01); *B01D 2313/90* (2013.01); *B01D 2315/04* (2013.01); *B01D 2321/20* (2013.01); *B01D 2321/2058* (2013.01)

(58) Field of Classification Search
None
See application file for complete search history.

(56) References Cited

U.S. PATENT DOCUMENTS

| | | | | |
|---|---|---|---|---|
| 3,653,600 A | * | 4/1972 | Schold | 241/74 |
| 3,669,879 A | * | 6/1972 | Berriman | 210/652 |
| 3,731,808 A | * | 5/1973 | Rickert | 210/138 |
| 3,827,564 A | * | 8/1974 | Rak | 210/321.83 |
| 4,094,784 A | * | 6/1978 | Hirano | 210/771 |
| 4,337,158 A | | 6/1982 | Bodine | |
| 4,735,716 A | * | 4/1988 | Petrucci et al. | 210/232 |

(Continued)

FOREIGN PATENT DOCUMENTS

| | | |
|---|---|---|
| JP | 08-057270 A | 3/1996 |
| JP | 2005-254071 A | 9/2005 |
| WO | 91-01796 A1 | 2/1991 |

*Primary Examiner* — Nam Nguyen
*Assistant Examiner* — Richard Gurtowski
(74) *Attorney, Agent, or Firm* — Schwabe, Williamson & Wyatt (57) ABSTRACT

Embodiments provide methods and apparatuses for filtering a fluid through a porous membrane, and more particularly, it provides filtration methods and apparatuses for tangential-flow filtration using Vibration Induced Dynamics (VID) with a spiral-wound membrane filter element. Embodiments provided herein induce vibration via rotation of an unbalanced inner tube within a central filtrate drain tube, via axial deformation of a substantially circular-cylindrical outer shell, or a combination thereof. Also disclosed herein are friction-reducing separator fabrics for interleaving with the membrane of a spiral-wound filter element.

21 Claims, 5 Drawing Sheets

(56) References Cited

U.S. PATENT DOCUMENTS

| | | | |
|---|---|---|---|
| 4,947,944 A * | 8/1990 | Coltman et al. | 175/73 |
| 6,099,730 A | 8/2000 | Ameer et al. | |
| 2002/0159827 A1 * | 10/2002 | Bentley | 403/359.1 |
| 2004/0188897 A1 * | 9/2004 | Edmondson et al. | 267/64.13 |
| 2005/0023207 A1 * | 2/2005 | Kirker et al. | 210/321.74 |
| 2005/0253675 A1 * | 11/2005 | Davison | 335/220 |
| 2008/0097499 A1 * | 4/2008 | Nash et al. | 606/159 |
| 2008/0105038 A1 * | 5/2008 | Jons et al. | 73/38 |

* cited by examiner

Figure 7 ents results in loss of extremely valuable residual product materials, expense and time for cleaning and sterilization of systems, and obvious loss of asset utilization productivity.
ENHANCED SPIRAL-WOUND MEMBRANE FILTRATION

CROSS REFERENCE TO RELATED APPLICATIONS

The present application claims priority to U.S. Provisional Patent Application No. 61/305,648, filed Feb. 18, 2010, entitled "ENHANCED SPIRAL-WOUND MEMBRANE FILTRATION," the disclosure of which is hereby incorporated by reference in its entirety.

TECHNICAL FIELD

This disclosure relates to a method and apparatus for filtering a fluid through a porous membrane, and more particularly, it relates to a filtration method and apparatus for tangential-flow filtration using Vibration Induced Dynamics (VID) with a spiral-wound membrane filter element.

BACKGROUND

Membrane filtration processes have long been employed for the selective removal of contaminants and/or salt from water. However, fouling of the membrane filter element limits the through-put rate of conventional tangential-flow filtration (TFF) systems. The lifetime of filter elements, in terms of achievable total through-put flux is similarly limited. This fouling is the result of both concentration polarization and retentate matter. Particularly in the pharmaceutical and bio-industries, these characteristics dictate that filtration/separation processes be batch processes rather than continuous. In batch processes, shutdown for replacement of filtration elements results in loss of extremely valuable residual product materials, expense and time for cleaning and sterilization of systems, and obvious loss of asset utilization productivity.

In the context of industrial processes, such as de-salination, the costs of excess pumping power, maintenance, labor, and materials, can severely impact the economy of production. Further, in the de-salting of drainage waters and of inland waste waters, there may be a volume fee for disposal of the retentate (brine, etc.), and the achievable concentration may be limited by filter membrane fouling.

It has been demonstrated that application of fluid shear in the supply side of a TFF filter element reduces fouling. However, the intuitive act of simply increasing the velocity of feed flow to induce shear results in an associated pressure gradient that manifests as an increased trans-membrane pressure (TMP) at the inlet side that results in further, progressive fouling.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Disclosed herein in various embodiments are methods and apparatuses for imparting fluid-shear-generating motions to the membrane-bounded feed-fluid passages of a spiral-wound (SW) filter element using vibration induced dynamics (VID). In various embodiments, such VID-induced shear may prevent or reduce membrane fouling, and may prolong the useful life of, or even immortalize the SW membrane. Also disclosed in various embodiments are interlacing helical weave separator fabrics that may be used in SW applications to reduce fouling and decrease possible membrane wear.

In general, having a trans-membrane pressure (TMP) drop across a filtration membrane is important in driving permeate through the membrane. However, this TMP drop also accelerates the fouling of the membrane. Shear in the feed flow over the membrane tends to forestall membrane fouling, and generally is created by increasing the tangential velocity of the feed fluid over the membrane while restricting that flow to a very thin layer. Shear also entails flow resistance, which is manifested by a pressure gradient along the feed fluid path. However, in general, increasing feed flow velocity to enhance shear further increases the TMP at the upstream end, reducing the anti-fouling effectiveness of the shear.

In some instances, this TMP issue may be resolved by separating the desired shear production from the feed transport in a process known as Vibration Induced Dynamic (VID) filtration, which was generally described for plate-type TFF in U.S. Pat. No. 5,985,160, which is incorporated herein by reference. In dynamically enhanced filtration in a plate-type TFF, an upper plate may be caused to vibrate relative to a lower plate in a direction normal to its plane, without changing the volume of the enclosed feed and filtrate fluids. This vibratory motion of the plates may result in an oscillatory modulation of the already small thickness of the feed fluid layer above the membrane, and may cause the feed fluid to rush back and forth laterally between inlet and outlet ends of its flow path with a velocity many times larger than that of the vibration itself. The large oscillating tangential velocity of the feed fluid may be accompanied by a large oscillating shear and TMP.

However, prior to this disclosure, no VID application existed for spiral-wound (SW) filtration, which is prevalent and nearly universally applied in water purification and desalination applications using reverse osmosis or its pre-filter precursor. The vibratory rocking motions used in plate-type TFF are not applicable to the cylindrical geometry of the SW element type, and prior to the present disclosure, no methods or apparatuses were available that could apply VID filtration enhancement to a SW membrane.

Figure 1:
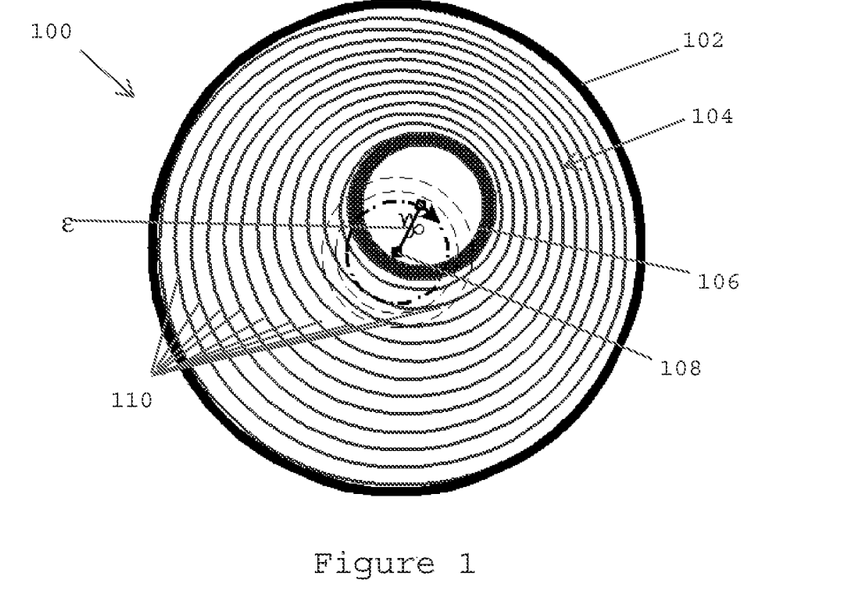
FIG. 1 illustrates a schematic diagram of an embodiment of a method and apparatus for imparting Vibration Induced Dynamic (VID) fluid-shear-generating motions to membrane-bounded feed-fluid passages of a spiral-wound filter element, in accordance with various embodiments.

FIG. 1 illustrates a schematic diagram of an embodiment of a first method and apparatus for imparting fluid-shear-generating motions to membrane-bounded feed-fluid passages of a spiral-wound filter element, in accordance with various embodiments. As shown in FIG. 1, in various embodiments, the SW filtration device 100 may include a substantially circular-cylindrical casing or shell 102, a spiral-wound (SW) filter element membrane 104 disposed within shell 102, and a central filtrate drain tube 106 disposed within SW filter element membrane 104. In various embodiments, fluid-shear-generating motions of the membrane-bounded feed-fluid passages may be generated when central filtrate drain tube 106 is caused to oscillate or orbit with a small eccentricity, ϵ, about the longitudinal, central axis 108 of the SW filter element membrane 104. The eccentricity is grossly exaggerated in FIG. 1 for clarity (as is the diameter of filtrate drain tube 106, to a certain extent, relative to that of the SW filter element membrane 104, and a single leaf representation of the truly multi-leaved, SW filter element membrane 104 geometry is used for convenience in drawing). In various embodiments, filtrate drain tube 106 may not itself rotate, but may merely nutate without rotational motion relative to the attached membrane/channel layers 110 of SW filter element membrane 104. In some embodiments, shell 102 may not be involved in the nutation motion, except as a nominally fixed outer boundary.

Figure 2:
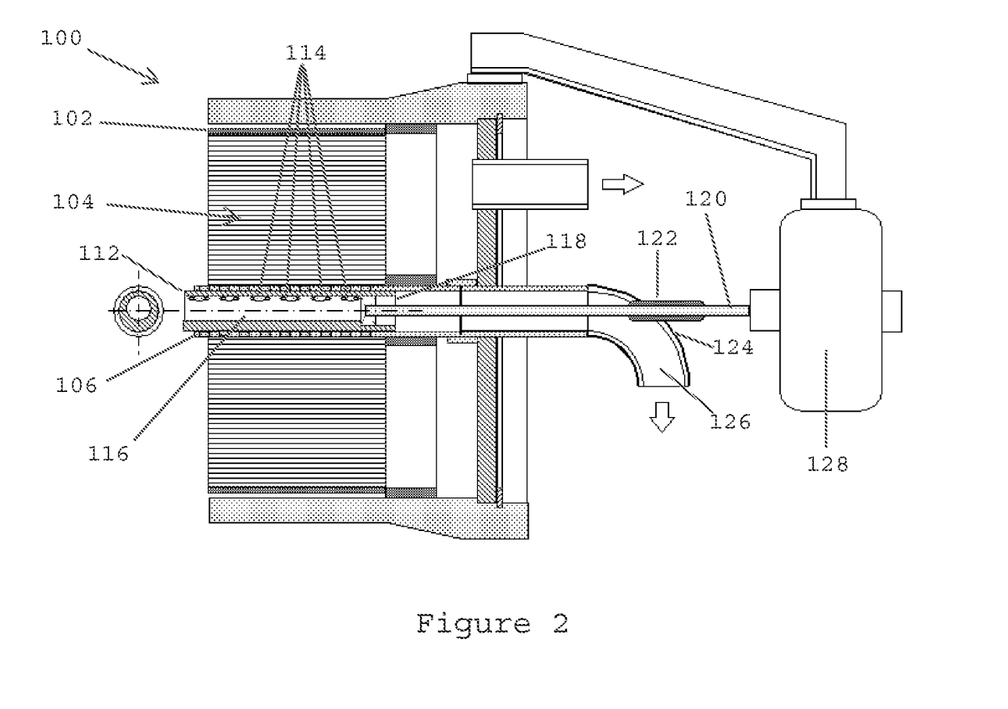
FIG. 2 illustrates a terminal end portion of an arrangement of a motorized drive for the SW VID filtration system of FIG. 1, in accordance with various embodiments

FIG. 2 illustrates an arrangement of one embodiments of a drive system for the SW VID filtration system of FIG. 1, in accordance with various embodiments. As illustrated in FIG. 2, in various embodiments, the nutation motion of filtrate drain tube 106 may be driven by the centrifugal force of an unbalanced inner tube 112 rotating within, and in peripheral contact with, filtrate drain tube 106. In various embodiments, unbalanced inner tube 112 also may be referred to as a drive tube, since, as will be discussed below and shown in FIG. 2, rotational radial drive force may be applied by unbalanced inner tube 112. In various embodiments, inner tube 112 may be made from a non-toxic, corrosion resistant metal or composite, and may be unbalanced by the eccentric removal of metal (e.g., drilled) from its wall. Alternatively or additionally, in some embodiments, the bore of unbalanced inner tube 112 may be eccentrically located relative to its exterior surface. In some embodiments, the resulting holes 114 in unbalanced inner tube 112 also may serve to allow passage of filtrate into its inner lumen 116 where it may drain from one or more ends 118. In various embodiments, unbalanced inner tube 112 may turn with its outer diameter having a small clearance with respect to the central bore of filtrate drain tube 106, and may depend on filtrate fluid lubrication and/or a combination of low-friction materials. In some embodiments, filtrate drain tube 106 may be made of plastic, and in particular embodiments, filtrate drain tube 106 and/or unbalanced inner tube 112 may be made from materials suitable for processing potable water.

Alternatively, in some embodiments, short bands of anti-friction material may be fitted intermittently between the inner wall of filtrate drain tube 106 and the outer surface of unbalanced inner tube 112 to form fluid-lubricated bearings.

In various embodiments, unbalanced inner tube 112 may be driven by a small diameter shaft 120 that may extend endwise through one or more seals 122, such as gland seals, in the outside elbow 124 of the filtrate drain 126, and thence to a fixed or variable-speed electric motor 128.

Figure 3:
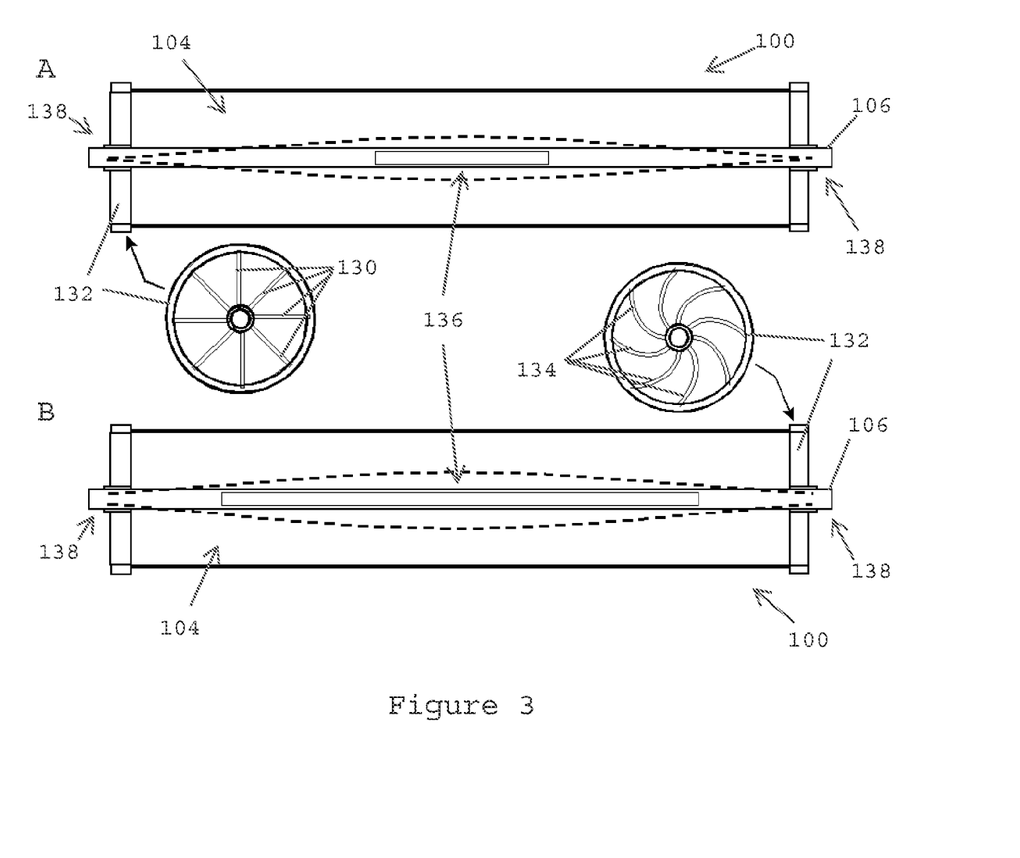
FIGS. 3A and 3B illustrate longitudinal sections of two embodiments of the SW VID filtration system shown in FIG. 1, having radial spokes (FIG. 3A) and curved spokes (FIG. 3B) on the anti-telescoping rings, in accordance with various embodiments.

FIGS. 3A and 3B illustrates two longitudinal sections of the SW VID filtration system shown in FIG. 1, in accordance with various embodiments. In various embodiments, in order to increase the radial, orbital motion, and its longitudinal extent, of filtrate drain tube 106 within SW filter element membrane 104, and to provide a beneficial resonance for this motion, the commonly radial spokes 130 (see, e.g., FIG. 3A) of the anti-telescoping rings 132 at the ends of SW filter element membrane 104 may be substituted by curved ones form symmetrically softer radial springs 134 (see, e.g., FIG. 3B). In various embodiments, radial springs 134 may be further stiffened or softened to achieve a desired resonance frequency. In general, achieving resonant motion may maximize efficiency and minimize the power requirements of the drive motor 128. In some embodiments, this may be the only modification to a standard SW filtration element that is needed.

In some embodiments, unbalanced inner tube 112 may be sufficiently rigid in bending that the eccentricity of orbit, and hence the amplitude of radial motion, may be more uniform throughout the length of SW filter element membrane 104, which may maximize use of use of the available membrane area. In other embodiments (see, e.g., FIG. 3A), the relatively stiff radial spokes 130 of anti-telescoping rings 132 may be retained, unbalanced inner tube 112 may have little bending rigidity (except, in some embodiments, through its mid-length 136) so that the amplitude of radial motion is maximal at mid-length 136 and near zero at the ends 138. Although this arrangement may make less than best use of the membrane area, in some embodiments, it may require no modification to a common conventional SW filter element membrane 104. In other embodiments, as shown in FIG. 3B, the unbalanced inner tube 112 may be made with sufficient bending rigidity to attain a bending resonance, manifested in a "whipping mode", at a desired frequency of rotation. The amplitude of radial motion is very greatly exaggerated in FIGS. 3A and 3B; for example, in various embodiments, radial motion amplitudes of the order of 1 mm may be expected in a SW filtration element approximately 200 mm in diameter.

FIGS. 4A and 4B illustrate schematic diagrams of another embodiment of an apparatus and method for imparting fluid-shear-generating motions to membrane-bounded feed-fluid passages, in accordance with various embodiments. In various examples, this embodiment may be used alone or with the embodiments described above to generate shear throughout the SW filter element. As shown in FIG. 4A, the SW filtration device 400 may include a generally cylindrical tubular casing or shell 402, with a SW filter element membrane 404 disposed within the lumen of shell 402. In various embodiments, shell 402 may be periodically slightly distorted from the generally cylindrical shape illustrated in FIG. 4A to the into an elliptical cross-section shape by the application of diametral forces, as shown in FIG. 4B. For example, in various embodiments, application of a lateral compression force-pair to the circular tube illustrated in FIG. 4A may slightly deform shell 402 to an elliptic shape with reduced minor, horizontal diameter and increased, vertical diameter, as shown in FIG. 4B. In various embodiments, an enhancement may be obtained by applying outward tension on opposite sides of shell 402 to deform shell 402 outward in lieu of or as well as compressing it inward.

In various embodiments, the elliptic radial deflection of shell 402 may be caused to rotate (in shape only, not material) about the longitudinal axis of SW filtration element at a particular rate (e.g., frequency). As in the embodiment illustrated in FIG. 1, in various embodiments, a circumferentially sinusoidal wave of oscillatory tangential motion of the (feed) fluid-filled contents of SW filter element membrane 404 may be imparted by the radially oscillating shell 402 motion. Thus, in various embodiments, with shell 402 so distorted, the cross-section of the SW filter element membrane 404 may be similarly distorted. Thus, in some embodiments, along a diameter where relative compression is applied, the thickness of each membrane/channel layer 410 may be reduced, for example, in proportion to the diameter reduction of shell 402. Similarly, in some embodiments, along a diameter where relative tension is applied to shell 402, the thickness of each membrane/channel layer 410 may be increased proportionately. In some embodiments, only the feed fluid channel layers in the membrane/channel layer 410 may be subject to substantial thickness compression or expansion. In various embodiments, these channel layers may be sized by screen-like meshes of thin polymer "wire," such as a plastic wire, whereas the SW membranes themselves and permeate fluid channels may be relatively incompressible. Therefore, in some embodiments, essentially all of the thickness changes in membrane/channel layers 410 may be found in the feed fluid channels. In some embodiments, this thickness change may be variable or substantially equivalent in magnitude to that of the radial displacement of shell 402 divided by the number of feed fluid layers.

In various embodiments, because the feed fluid is generally incompressible, when an elliptical distortion is applied to shell 402, the feed fluid may be partly displaced, in layer, from compression regions to extension regions. In various embodiments, the maximum displacement for an elliptical form may subtend 90 degrees in polar coordinates. Thus, in various embodiments, if the distortion of shell 402 is applied periodically in time (e.g., at a frequency), the angular motion of the feed fluid, in layer, may occur at some oscillatory velocity. In various embodiments, such velocities may be directly proportional to the frequency, inversely proportional to the undisturbed feed-fluid layer thickness, and directly proportional to the radius of a membrane/channel layer 410. Thus, in various embodiments, the oscillatory motion of the feed-fluid, so induced, may be tangential, that is, at right-angles to the steady axial velocity of the feed.

In various embodiments, the nominal value of shear associated with the feed-fluid motion may be equal to the velocity divided by the feed fluid layer thickness. In some embodiments, the true shear at the membrane surface under the viscous boundary layer may be further multiplied by the square-root of the frequency/kinematic viscosity quotient. For example, in some embodiments, in the outermost of 20 feed-fluid layers, 1 mm thick, in a 4 inch diameter SW filter element membrane 404 elliptically oscillating at 60 Hertz frequency, with maximum radial amplitude of 1 mm, the true shear may be approximately 6,000 inverse seconds, and this level of shear may be found uniformly throughout the radial extent of those layers of SW filter element membrane 404.

Figure 4:
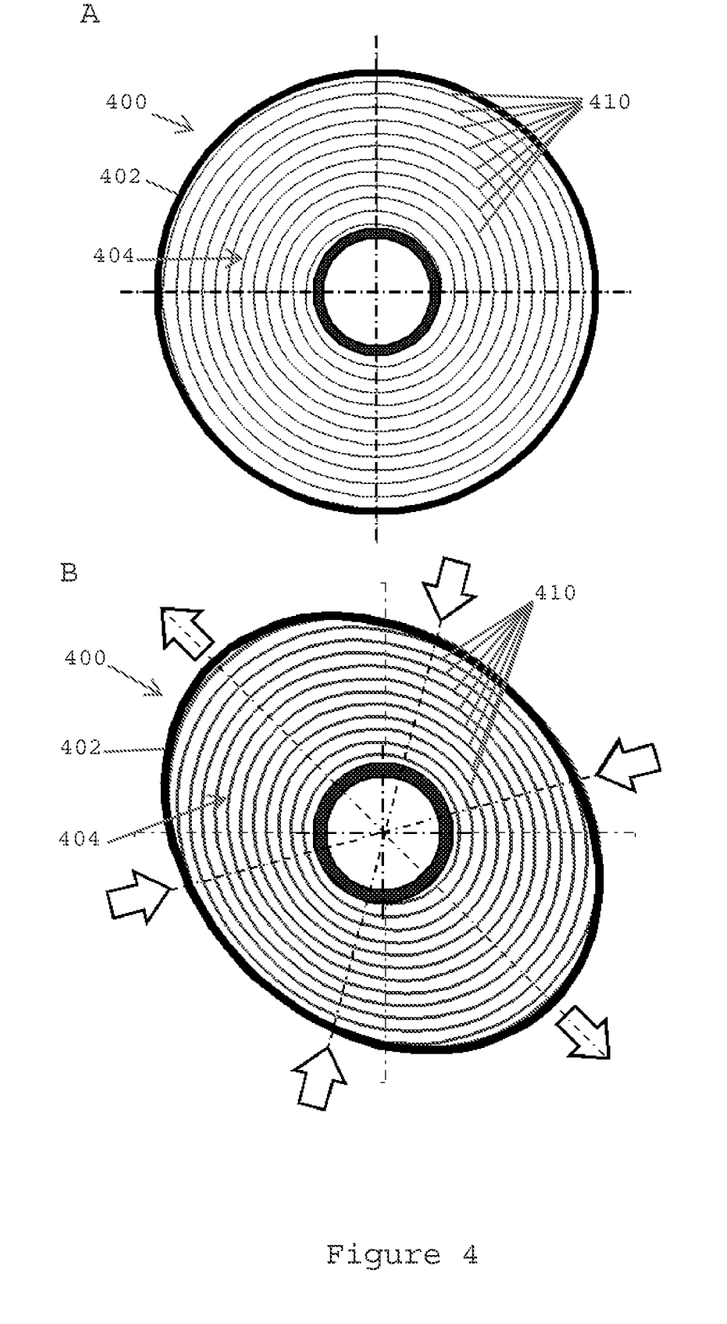
FIGS. 4A and 4B illustrate schematic diagrams of another embodiment of an apparatus and method for imparting fluid-shear-generating motions to membrane-bounded feed-fluid passages, with a cross section at rest (FIG. 4A) and with compression forces applied (FIG. 4B), in accordance with various embodiments.
Figure 5:
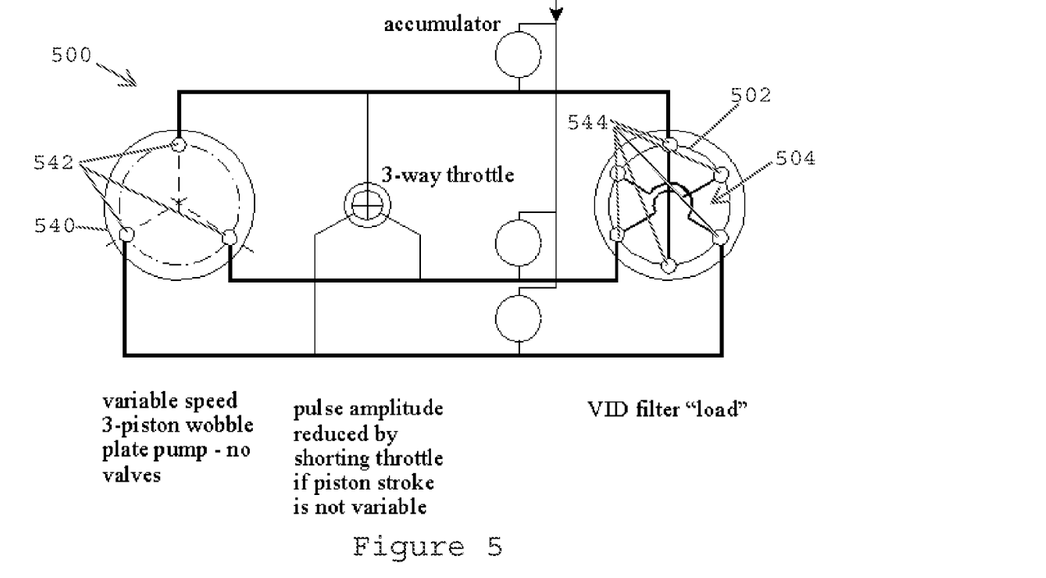
FIG. 5 illustrates a schematic diagram of a hydraulic driver system for providing excitation forces, in accordance with various embodiments.
Figure 6:
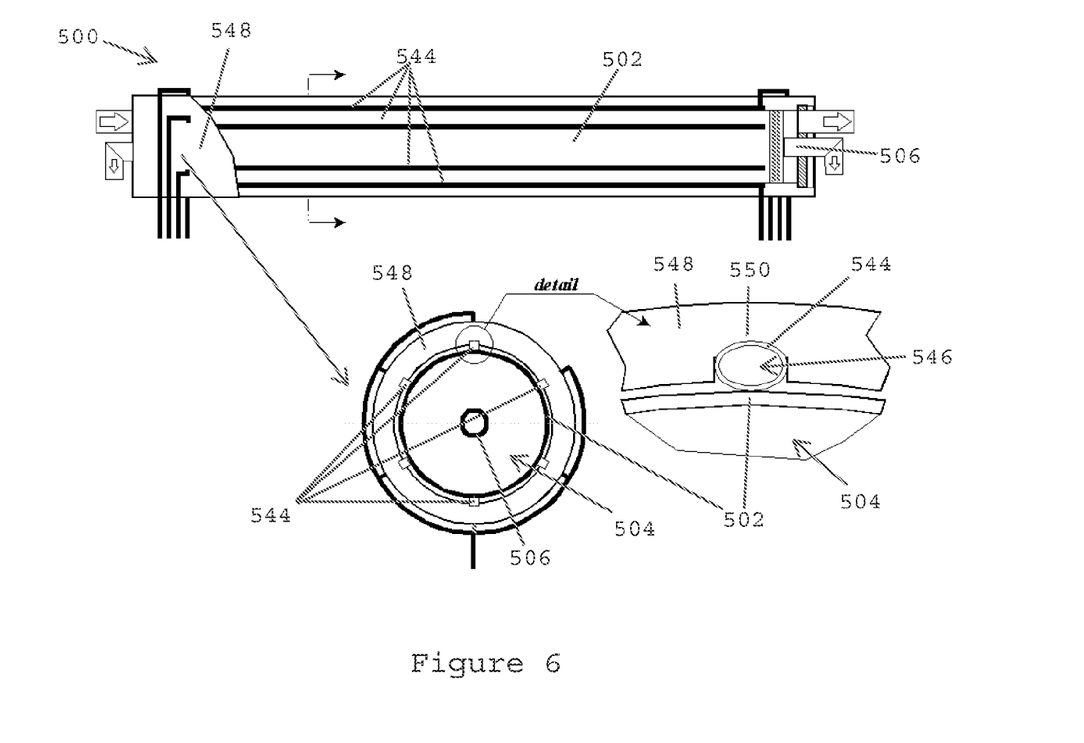
FIG. 6 illustrates a partial cutaway view of the VID filter "load" system of FIG. 5.

In one embodiment, in association with the VID SW filter system of FIGS. 4 and 6, a hydraulic piston system may provide excitation forces. FIG. 5 illustrates a schematic diagram of such a hydraulic piston system 500, and FIG. 6 illustrates a partial cutaway view of the VID filter "load" system of FIG. 5, in accordance with various embodiments. Referring to FIG. 5, in the illustrated embodiment, a single power unit (not shown) may drive one or more SW filter element membranes 504 using either high frequency-response control valves (not shown) or by employing a power pump 540 of the "wobble-plate" type with three or more separate piston outputs 542, which may be equally phase-spaced. In the illustrated embodiment, the frequency of pump rotation may be twice that of the driven mode of vibration.

As shown in FIGS. 5 and 6, the SW filter element membrane 504 may be bounded by a substantially cylindrical casing or shell 502, which may be deformed modally in response to applied forces. In the illustrated embodiment, piston outputs 542 may be in fluid communication with a plurality of equal-angularly spaced hydraulic forcing elements 544 arrayed about the circumference of shell 502, and nominally uniformly (or otherwise systematically, for instance in a helix) along its length. In various embodiments, hydraulic forcing elements 544 containing hydraulic fluid 546, and shell 502 may both be housed within a close-fitting structural case or pressure vessel 548, which may provide a relatively rigid surface against which hydraulic forcing elements 544 may press when inflated by a pulse of hydraulic fluid. In some embodiments, hydraulic forcing elements 544 may have a flattened or elliptical cross-sectional shape, and may fit within recesses 550 in pressure vessel 548. In some embodiments, pressure vessel 548 may be less deformable that shell 502, such that pressure from hydraulic fluid 546 within hydraulic forcing elements 544 may deform shell 502 and not pressure vessel 548.

In various embodiments, in response to pulses of hydraulic fluid 546 from power pump 540 and piston outputs 542, hydraulic forcing elements 544 may apply radial compressive forces to shell 502 in a pattern conducive to creating the elliptic mode of radial deflection in shell 502. In various embodiments, these forces may be applied at a selectable frequency in a time-wise, for instance sinusoidal manner, and in some embodiments, with phase relations among hydraulic forcing elements 544 that may cause the modal vibratory elliptic deflection shape to rotate about the longitudinal axis of SW filter element membrane 504. In various embodiments, the frequency of the force applications may be that of the resonance of shell 502, with its internal fluid-loading, in an elliptical mode that may be termed the "first lobar mode", or alternatively, the "four-noded mode," in contrast to the nutational mode illustrated in FIG. 1. In some embodiments, the central filtrate drain tube 106, 506 need not participate in this first lobar mode motion except as a relatively rigid inner boundary. However, in some embodiments, both the nutational mode of FIG. 1 and the first lobar mode of FIGS. 5 and 6 may be combined to produce VID throughout the full thickness of SW filter element membrane 104, 504, for instance with the nutational mode producing VID that may radiate outward from central filtrate drain tube 106, 506, and with the first lobar mode producing VID that may radiate inward from shell 102, 502. In various embodiments, the two modes may operated in concert in a pulsatile or continuous fashion, and may be configured to cooperate in achieving resonance with shell 102, 502, fluid-filled SW filter element membrane 104, 504, and central filtrate drain tube 106, 506.

In some embodiments, hydraulic forcing elements 544 may subtend a much larger arc length on shell 502 than is shown. In some embodiments, this may avoid exciting higher modes of vibration, which may waste power while contributing very little to the desired magnitude and distribution of feed-fluid shear. Additionally, in some embodiments, wider hydraulic forcing elements 544 may require proportionately less pressure, but more volume flow, to operate with the same modal excitation. Furthermore, although the illustrated embodiment has six hydraulic forcing elements 544 spaced pair-wise on opposite sides of shell 502, one of skill in the art will appreciate that any number of hydraulic forcing elements 544, may be used, based on the size of system 500, the frequency desired, and the various operating pressures involved. For instance, some embodiments of system 500 may have only one hydraulic forcing element 544, whereas other systems 500 may have 2, 3, 4, 5, 6, 7, 8, 9, 10, 11, 12, or even more hydraulic forcing elements 544.

As discussed above, in various embodiments, it may be desirable to operate system 500 at the frequency of mechanical resonance of the lobar mode of the fluid-filled shell 502. In various embodiments, at resonance, the mechanical impedance presented by shell 502 may be entirely resistive, with the opposing reactive components canceling. In these embodiments, the input power required may then be minimized, with essentially all of it going only into shear generation. In various embodiments, assuming line frequency excitation, the structure of shell 502 may be carefully selected. For instance, if a variable frequency is used, such frequency may be adjusted to the resonance of an existing shell 502. Conversely, with a fixed frequency electromagnetic driver, vibratory motion amplitude, and hence shear magnitude, may be in proportion to amperage, and variable with line voltage.

Other embodiments may use the same principals, but may use other types of excitation forces. For instance, in some embodiments, hydraulic or pneumatic piston arrangements surrounding shell 402 may be driven via multi-port rotary valves. In other embodiments, piezoelectric drivers may be used. Further embodiments include a rotating set of pinch-rollers to excite the distortion.

For example, in various embodiments, one method and apparatus for exciting a desired lobar vibration of shell 402 may be electromagnetic. In various embodiments, the stator of a two-pole AC electric motor may be built into a fixed outer casing into which SW filter element membrane 404 may be inserted, endwise. In various embodiments, magnetic pole faces may surround shell 402 with a small radial "air-gap." In various embodiments, shell 402 may be tightly wrapped with coated iron wire to provide an inter-pole field path and radial attractive forces when the poles are energized. In various embodiments, as the magnetic force is attractive, without regard to the magnetic polarity, the excitation frequency would be twice that of the power line. Further, in various embodiments, a six-pole stator, with three-phase power, may create an elliptical distortion pattern rotating at line frequency. Thus, in various embodiments, the angular distribution of shear may be quite uniform, thus maximizing membrane surface utilization.

Returning to the nutational mode illustrated in FIG. 1, in some embodiments, a circumferentially sinusoidal wave of motion of the fluid-filled contents of SW filter element membrane 104 may be imparted by the radially oscillating filtrate drain tube 106 nutating motion. In particular, in some embodiments, there may be imparted a pattern of vibratory radial compressions, for instance, alternating angularly with nominally equal radial expansions of the feed-fluid layers of SW filter element membrane 104. In various embodiments, amplitudes of the radial compressions and expansions of the individual feed-fluid passages may be found to have a sum, along any radius at any instant of time, that may be equal to the eccentricity of motion of the filtrate drain tube 106, locally. In various embodiments, the inter-membrane filtrate passages may not materially share in the imparted radial compressions and expansions because they may be nearly fixed by stiff internal separating structures, whereas the feed passages may be compliantly separated.

In various embodiments, as the peripheral wavelength of nutational mode of vibration may be equal to the circumference at any internal radius, and the maximum peripheral path length for the displacement of any incompressible enclosed fluid element, from a region of compression to one of expansion, may be one half of a wavelength, it may be appreciated that a considerable oscillatory tangential velocity will be imparted to such fluid elements when operating at a sensible frequency, the fluid layer radial thickness being very small in comparison with such path lengths. With finite fluid viscosity, this oscillatory peripheral velocity, when vectorially added to the generally smaller steady axial velocity of the fluid feed flow, may be accompanied by significant fluid shear stress on both the inner and outer membrane boundaries of each such layer. Without being bound by theory, this alternating shear is believed to be responsible for the anti-fouling properties of the VID filtration system.

By contrast, in various embodiments, as the peripheral wavelength of the elliptic mode of vibration in the first lobar mode may be equal to one-half of the circumference at any internal radius, and the maximum peripheral path length for the displacement of any fluid element, from a region of contraction to one of extension, may be one half of a wavelength, the oscillatory tangential velocity, and hence shear magnitude generated in the first lobar mode may be half that of the nutational mode, all else being equal.

FIGS. 7A, 7B, and 7C illustrate a planar view (FIG. 7A), edge view (FIG. 7B), and axial view (FIG. 7C) of an interwoven helical feed channel separator; in accordance with various embodiments. In various embodiments, the circumferentially sinusoidal wave of radial oscillating shell motion may be found to be imparted to the fluid-filled contents of SW filter element membrane 504. In particular embodiments, a pattern of vibratory radial compressions may be imparted, alternating angularly with equal radial expansions in the thicknesses of the feed-fluid layers of SW filter element membrane 504. In various embodiments, in the first lobar mode, the amplitudes of the radial compressions and expansions of the individual feed-fluid passages may have a sum, along any radius at any instant of time, equal to that of shell 502, locally.

In various embodiments, the feed fluid channels of SW filter element membrane 104, 504 may be maintained uniformly open by the inclusion of a thin (e.g., less than 1 mm) woven separator of polymer (e.g., plastic or another appropriate material) threads. In various embodiments, this separator may have a rectangular weave of these threads in an over-and-under pattern, remarkably similar, but for size, to a common window screen. In various embodiments, feed fluid may find its way over and under the "threads" of the separator screen, and the filtration process may benefit from the turbulence so generated, albeit at some cost due to associated flow resistance.

Figure 7:
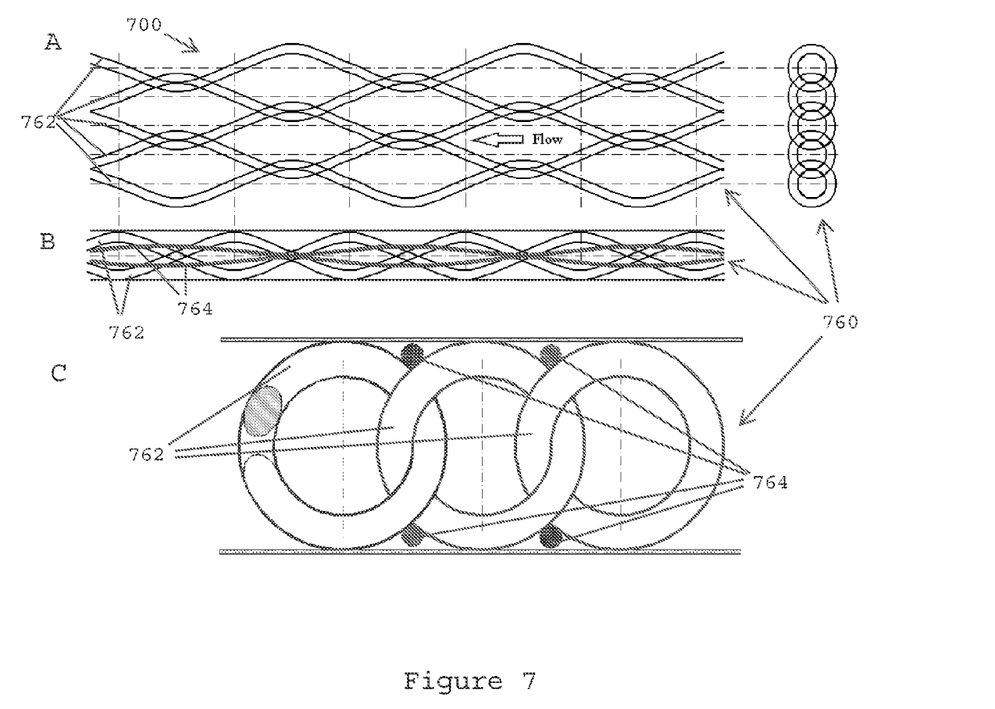
FIGS. 7A, 7B, and 7C illustrate a planar view (FIG. 7A), edge view (FIG. 7B), and axial view (FIG. 7C) of an interwoven helical feed channel separator; in accordance with various embodiments.

In particular embodiments, damage may possibly occur to the bounding membrane layers 110 due to "rubbing" of the separator fabric against them when undergoing vibratory motions associated with VID filtration. In some embodiments, for instance, marks may be observable on the membrane surfaces due to cycles of pressurization and de-pressurization during the life of an element upon a "post-mortem" examination. However, in various embodiments, there may be no damage to membrane layers 110 that may be associated with such marks. Nevertheless, as illustrated in FIG. 7, such potential damage may be prevented in various embodiments by the provision of a separator 700 configured as a sheet 760 formed from an array of interwoven helical threads 762 of an appropriate polymer or other appropriate material. In some embodiments, separator 700 may include tie threads 764, which may help maintain helices in a desired spacing and orientation. In various embodiments, helices 762 may have a pitch very many times larger than their diameters, and their axes may be longitudinal, that is, in the direction of the feed flow. Thus, in various embodiments, rather than rubbing against the bounding membranes, helices 762 may simply roll when subjected to the small, tangential, cross-channel shear motion associated with the first lobar and nutational modes described above.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A Vibration Induced Dynamic (VID) spiral wound filtration device comprising:
    a spiral wound filter element comprising a fluid inlet, an effluent outlet, and a filtrate outlet tube, wherein the spiral wound filter element comprises a spiral wound filter membrane;
    a substantially cylindrical radially perforated central filtrate drain tube in direct contact with and disposed within the spiral wound filter membrane, wherein the substantially cylindrical radially perforated central filtrate drain tube is configured to transmit vibration to the spiral wound filter membrane, and wherein the substantially cylindrical radially perforated central filtrate drain tube nutates, but does not rotate with respect to the spiral wound filter element, and wherein filtrate passes radially inward along a tangential spiral path through the spiral wound filter element to drain through the substantially cylindrical radially perforated central filtrate drain tube; and
    a first motor adapted to induce cyclical modal vibration of the substantially cylindrical radially perforated central filtrate drain tube;
    wherein the spiral wound filter membrane is disposed within and constrained by a substantially circular-cylindrical shell;
    wherein the substantially circular-cylindrical shell is disposed within a pressure vessel;
    wherein the Vibration Induced Dynamic (VID) spiral wound filtration device further comprises a plurality of hydraulic tubes disposed between the substantially circular-cylindrical shell and the pressure vessel;
    wherein a second motor is configured to selectively expand the hydraulic tubes with periodic pressure pulsations at a selectable rate; and
    wherein the periodic pressure pulsations in the hydraulic tubes are configured to deform the substantially circular-cylindrical shell; and
    wherein the periodic pressure pulsations are timed to induce radial vibrations of a lobar-modal form in the substantially cylindrical shell.

2. The Vibration Induced Dynamic (VID) spiral wound filtration device of claim 1,
    wherein the Vibration Induced Dynamic spiral wound filtration device further comprises an unbalanced inner shaft disposed within the central filtrate drain tube;
    wherein the motor is adapted to rotate the unbalanced inner shaft within the central filtrate drain tube; and
    wherein the unbalanced inner shaft is configured to induce nutation in the central filtrate drain tube.

3. The Vibration Induced Dynamic (VID) spiral wound filtration device of claim 2, wherein the unbalanced inner shaft comprises a heavy elastic material.

4. The Vibration Induced Dynamic (VID) spiral wound filtration device of claim 3, wherein the heavy elastic material comprises stainless steel or a composite material that is compatible with potable water for human consumption.

5. The Vibration Induced Dynamic (VID) spiral wound filtration device of claim 2, further comprising fluid-lubricated bearings disposed between the unbalanced, inner shaft and the central filtrate drain tube, wherein the fluid-lubricated bearings are compatible with potable water for human consumption.

6. The Vibration Induced Dynamic (VID) spiral wound filtration device of claim 2, wherein the unbalanced inner shaft is coupled to the motor by a slender drive shaft disposed at least partially within the filtrate outlet tube.

7. The Vibration Induced Dynamic (VID) spiral wound filtration device of claim 6, wherein a junction between the slender drive shaft and a wall of the filtrate outlet tube is sealed via a gland seal, and wherein the slender drive shaft and gland seal are compatible with potable water for human consumption.

8. The Vibration Induced Dynamic (VID) spiral wound filtration device of claim 2, wherein the motor comprises a variable, selectable, or fixed speed electric, hydraulic, or pneumatic motor.

9. The Vibration Induced Dynamic (VID) spiral wound filtration device of claim 6, wherein the slender drive shaft is coupled to the unbalanced inner shaft via one or more connector elements, and wherein the motor is inherently or controllably incapable of transmitting a torque in excess of the strength of the slender drive shaft and/or the connector elements.

10. The Vibration Induced Dynamic (VID) spiral wound filtration device of claim 9, wherein the slender drive shaft and connector elements are configured to permit the free flow of filtrate fluid through the central filtrate drain tube and the filtrate outlet tube.

11. The Vibration Induced Dynamic (VID) spiral wound filtration device of claim 2, wherein two or more spiral wound filter elements are coupled in series, wherein each spiral wound filter element comprises a central filtrate drain tube disposed within the spiral would filter element and an unbalanced inner shaft disposed within the central filtrate drain tube; and wherein each unbalanced inner shaft is configured to be rotated in series by slender drive shafts coupling the unbalanced inner shafts one to another in series via spline connector members.

12. The Vibration Induced Dynamic (VID) spiral wound filtration device of claim 1, wherein the device is configured to generate resonant or multiresonant radial vibration.

13. The Vibration Induced Dynamic (VID) spiral wound filtration device of claim 1; wherein the plurality of hydraulic tubes comprises 4-6 hydraulic tubes.

14. The Vibration Induced Dynamic (VID) spiral wound filtration device of claim 1; wherein the plurality of hydraulic tubes forms a helix about a circumference of the substantially circular-cylindrical shell.

15. The Vibration Induced Dynamic (VID) spiral wound filtration device of claim 1; wherein the motor comprises an external multi-piston hydraulic pump.

16. The Vibration Induced Dynamic (VID) spiral wound filtration device of claim 1; wherein the substantially circular-cylindrical shell is disposed within a pressure vessel;
  wherein the Vibration Induced Dynamic (VID) spiral wound filtration device further comprises a plurality of pneumatic, piezo-electric, electromagnetic, or mechanical devices disposed between the substantially circular-cylindrical shell and the pressure vessel;
  wherein the pneumatic, piezo-electric, electromagnetic, or mechanical devices are configured to deform the substantially circular-cylindrical shell with periodic pressure pulsations; and
  wherein the periodic pressure pulsations are timed to induce radial vibrations of a lobar-modal form in the substantially circular-cylindrical shell.

17. The Vibration Induced Dynamic (VID) spiral wound filtration device of claim 2;
  wherein the spiral wound filter element membrane is disposed within and constrained by a substantially circular-cylindrical shell;
  wherein the substantially circular-cylindrical shell is disposed within a pressure vessel;
  wherein the Vibration Induced Dynamic (VID) spiral wound filtration device further comprises a plurality of hydraulic tubes disposed between the substantially circular-cylindrical shell and the pressure vessel;
  wherein the motor is configured to selectively inflate the hydraulic tubes with periodic pressure pulsations at a selectable rate;
  wherein the periodic pressure pulsations in the hydraulic tubes are configured to deform the substantially circular-cylindrical shell;
  wherein the periodic pressure pulsations are timed to induce radial vibrations of a lobar-modal form in the substantially circular-cylindrical shell; and
  wherein the Vibration Induced Dynamic (VID) spiral wound filtration device is configured to continuously or periodically:
    (1) induce nutation in the central filtrate drain tube via rotation of the unbalanced inner shaft;
    (2) deform the substantially circular-cylindrical shell via the periodic pressure pulsations in the hydraulic tubes; or
    (3) a combination thereof.

18. The Vibration Induced Dynamic (VID) spiral wound filtration device of claim 1;
  wherein the substantially circular-cylindrical shell is disposed within a pressure vessel;
  wherein the substantially circular-cylindrical shell and the spiral wound filter membrane disposed therein are configured to rotate at a selectable rate within the pressure vessel and about a longitudinal axis via an array of rollers disposed between the pressure vessel and the substantially circular-cylindrical shell; and
  wherein the array of rollers is configured to apply radial forces to the substantially circular-cylindrical shell, thereby periodically modally deforming the shell.

19. The Vibration Induced Dynamic (VID) spiral wound filtration device of claim 18, wherein the substantially cylindrical radially perforated central filtrate drain tube is configured to exit the pressure vessel through a rotary seal adapted to prevent ingress of pressurized feed fluid.

20. The Vibration Induced Dynamic (VID) spiral wound filtration device of claim 19, further comprising an annulus disposed between the substantially circular-cylindrical shell and the pressure vessel, wherein a labyrinth seal or lip seal is disposed at each of two ends of the substantially circular cylindrical shell and configured to impede an axial flow of feed fluid in the annulus.

21. A Vibration Induced Dynamic (VID) spiral wound filtration device comprising:
  a spiral wound filter element comprising a feed fluid inlet, effluent outlet, and a filtrate outlet tube, wherein the spiral wound filter element comprises a spiral wound filter membrane; and
  a radially perforated central filtrate drain tube disposed within the spiral wound filter element and configured to drain filtrate to the filtrate outlet tube, wherein filtrate passes radially inward along a tangential spiral path through the spiral wound filter element to drain through the radially perforated central filtrate drain tube;
  wherein the spiral wound filter element membrane is disposed within and constrained by a substantially circular-cylindrical shell;
  wherein the substantially circular-cylindrical shell is disposed within a pressure vessel;
  wherein the Vibration Induced Dynamic (VID) spiral wound filtration device further comprises a plurality of hydraulic tubes disposed between the substantially circular-cylindrical shell and the pressure vessel;
  wherein a motor is configured to selectively expand the hydraulic tubes with periodic pressure pulsations at a selectable rate; and
  wherein the periodic pressure pulsations in the hydraulic tubes are configured to deform the substantially circular-cylindrical shell; and
  wherein the periodic pressure pulsations are timed to induce radial vibrations of a lobar-modal form in the substantially circular-cylindrical shell.

* * * * *

UNITED STATES PATENT AND TRADEMARK OFFICE
CERTIFICATE OF CORRECTION

PATENT NO.         : 9,101,884 B2
APPLICATION NO.    : 13/579662
DATED              : August 11, 2015
INVENTOR(S)        : Neal A. Brown Page 1 of 1

It is certified that error appears in the above-identified patent and that said Letters Patent is hereby corrected as shown below:

Title Page:

Item (57), In the Abstract
Line 7, "...axial..." should read "...radial...".

In the Claims:

Claim 11, Column 11
Line 14, "...would..." should read "...wound...".

Signed and Sealed this
Twenty-third Day of August, 2016

Michelle K. Lee
*Director of the United States Patent and Trademark Office*